United States Patent [19]

Arai et al.

[11] Patent Number: 5,299,322
[45] Date of Patent: Mar. 29, 1994

[54] COMPUTER SYSTEM WITH IMPROVED INTERFACE CONTROL OF AN I/O EXPANSION UNIT

[75] Inventors: Makoto Arai; Emiko Iizuka, both of Tokyo, Japan

[73] Assignee: Kabushiki Kaisha Toshiba, Kawasaki, Japan

[21] Appl. No.: 55,908

[22] Filed: May 3, 1993

Related U.S. Application Data

[63] Continuation of Ser. No. 659,260, Feb. 22, 1991, abandoned.

[30] Foreign Application Priority Data

Feb. 23, 1990 [JP] Japan .................................. 2-40925
Mar. 30, 1990 [JP] Japan .................................. 2-84672

[51] Int. Cl.$^5$ ............................................. G06F 13/00
[52] U.S. Cl. .................................................. 395/275
[58] Field of Search ....................... 395/275, 325, 500

[56] References Cited

U.S. PATENT DOCUMENTS

| | | |
|---|---|---|
| 3,970,999 | 7/1976 | Elward . |
| 4,051,326 | 9/1977 | Badagnani et al. . |
| 4,144,565 | 3/1979 | Bouknecht et al. . |
| 4,204,249 | 5/1980 | Dye et al. . |
| 4,312,035 | 1/1982 | Greene . |
| 4,377,000 | 3/1983 | Staab . |
| 4,504,927 | 3/1985 | Callan ................ 395/275 |
| 4,604,690 | 8/1986 | Crabtree et al. . |
| 4,667,289 | 5/1987 | Yoshida et al. . |
| 4,674,031 | 6/1987 | Siska . |
| 4,782,355 | 11/1988 | Sakai et al. . |
| 4,858,162 | 8/1989 | Kieffer ................ 364/708 |
| 4,862,354 | 8/1989 | Fiacconi et al. . |
| 4,985,804 | 1/1991 | Campbell et al. . |
| 5,014,193 | 5/1991 | Garner et al. . |
| 5,021,983 | 6/1991 | Nguyen et al. . |
| 5,097,439 | 3/1992 | Patriquin et al. . |
| 5,109,493 | 4/1992 | Banerjee . |
| 5,109,495 | 4/1992 | Fite et al. . |
| 5,119,497 | 6/1992 | Freige et al. . |
| 5,121,500 | 6/1992 | Arlington et al. . |
| 5,163,124 | 11/1992 | Yabe et al. . |

FOREIGN PATENT DOCUMENTS

| | | |
|---|---|---|
| 0281999 | 9/1988 | European Pat. Off. . |
| 56-157554 | 12/1981 | Japan . |
| WO8810468 | 12/1988 | PCT Int'l Appl. . |
| 2223116 | 3/1990 | United Kingdom . |

OTHER PUBLICATIONS

EDN: Feb. 4, 1981: "Interrogation tells $\mu P$ which boards are present"; N. D. Mackintosh.

*Primary Examiner*—Robert L. Richardson
*Attorney, Agent, or Firm*—Oblon, Spivak, McClelland, Maier & Neustadt

[57] ABSTRACT

A personal computer system capable of connecting to an expansion unit is designed to eliminate the need for a user to set the I/O address and interrupt level of an I/O controller to be connected to the expansion unit, thereby reducing the operational tasks of the user. In this respect, in the BIOS (Basic Input/Output System) is provided a program, which checks the connection status of the expansion unit to the system when power is on, and disables an I/O controller incorporated in the computer main frame and sets the I/O controller connected to the expansion unit to the desired configuration upon judging that the expansion unit is connected. Even when the expansion unit is connected after power is cut off in resume mode, therefore, the expansion unit can be used without forcing the user to set the mode back to a boot mode.

4 Claims, 4 Drawing Sheets

COMPUTER SYSTEM WITH IMPROVED INTERFACE CONTROL OF AN I/O EXPANSION UNIT

This application is a continuation of application Ser. No. 07/659,260, filed on Feb. 22, 1991, now abandoned.

BACKGROUND OF THE INVENTION

Field of the Invention

The present invention relates to a computer system capable of connecting an expansion unit.

Description of the Related Art

In the field of personal computers, laptop type computers, which are compact, light and convenient to carry around, become very popular as compared with the conventional desktop type. The laptop personal computers reflect many design efforts to improve operability as well as to reduce power consumption. A function to support a resume mode is a typical example of such efforts.

The "resume mode" is such that information of the input/output (I/O) address and interrupt level of each I/O controller at the time the power of the computer main frame has been cut off, as well as information of the display screen and various registers are held so that when power is resumed, the computer can spontaneously be set up from the state existing immediately before the power cutoff.

A personal computer has I/O controllers, such as a serial input/output (SIO) unit and a printer controller, incorporated in its main frame for connection to external I/O devices, such as a communication device and a printer. For use with several external I/O devices, the main frame of the personal computer is connected to these I/O devices via cables or the like. When the personal computer is of a portable type and one wants to carry it around and use it alone, these cables should all be removed. When the user wants to use the I/O devices again, the user should connect several cables again accordingly. However, the number of external I/O controllers, such as an option card, connectable to the main frame is limited so that more than the limited number of I/O controllers cannot be connected.

To overcome these shortcomings, an expansion unit has been developed. The expansion unit, connectable via a single cable to the computer main frame, comes equipped with I/O controllers equivalent to those incorporated in the main frame to permit connection of several I/O devices. When one wants to use this personal computer alone, he has only to disconnect a single cable. Further, several external I/O controllers can be connected to the expansion unit.

The personal computer has hardware (I/O configuration controller) which permits a CPU to set the I/O address, interrupt level, etc. of each I/O controller. The personal computer holds information about the address and interrupt level of each I/O controller, which have been set by a user with the help of a hardware configuration setup program, and can use the I/O controllers with the setting unless the setting is changed.

In using the conventional expansion unit having no hardware such as the I/O configuration controller, when a user wants to set the I/O address, interrupt level, etc. of each I/O controller in the expansion unit to the desired setting, the user should operate switches or the like on the expansion unit to make the setting.

According to the above conventional system, although the use of the expansion unit eliminates the user needing to connect several cables, the user still has to set the I/O address, interrupt level, etc. of each I/O controller in the expansion unit, using the manual switches or the like provided on the expansion unit.

In addition, according to the conventional structure, even when the expansion unit is connected after the power of the personal computer having been used as a stand alone type is cut off in resume mode, and the power is provided again, the hardware configuration at the time of the power cutoff sets up the computer as if having no expansion unit. Accordingly, even though the expansion unit is actually connected, the I/O address, interrupt level, etc. of each I/O controller in the case of the expansion unit disconnected will be set in the main frame, inhibiting the use of the I/O controllers of the expansion unit. When the user wants to use the I/O controllers in the expansion unit, therefore, he must first change the mode of the computer to the boot mode, then turn the power on.

SUMMARY OF THE INVENTION

It is therefore an object of the present invention to provide a personal computer capable of connecting to an expansion unit, which eliminates the need for a user to set the I/O address, interrupt level, etc. of an I/O controller in the expansion unit, thereby reducing the necessary tasks of the user.

It is another object of this invention to provide a personal computer system which does not require a user to set its mode back to a boot mode even when an expansion unit is connected after power cutoff in resume mode, thereby allowing the user to use the expansion unit in resume mode.

A screen printing according to the present invention comprises a computer main frame and an expansion unit to be connected via interface means to the personal computer main frame.

The personal computer main frame incorporates program executing means, which checks the connect mount status of the expansion unit to the system upon power ON, acquires a status from a memory when the expansion unit is not connected, and sets an I/O controller to be connected to the main frame to the desired configuration in accordance with the acquired status. When the expansion unit is connected, the program executing means disables an I/O controller incorporated in the main frame, acquires a status from the memory and sets the I/O controller connected to the expansion unit to the desired configuration.

With the above arrangement, when the expansion unit is simply connected to the personal computer system, a BIOS (Basic Input/Output System) ROM can automatically set the hardware configuration, such as the I/O address and interrupt level of the I/O controller in the expansion unit, equal to the one in the computer main frame. The expansion unit can therefore be used without requiring a user to set the mode back to the boot mode. This can eliminate troublesome tasks of connecting the expansion unit in resume mode set, setting the mode to the boot mode when power is provided, and cutting off the power again, then providing the power again.

DETAILED DESCRIPTION OF THE PREFERRED EMBODIMENTS

Embodiments of the present invention will be described below with reference to the accompanying drawings.

Figure 1A:
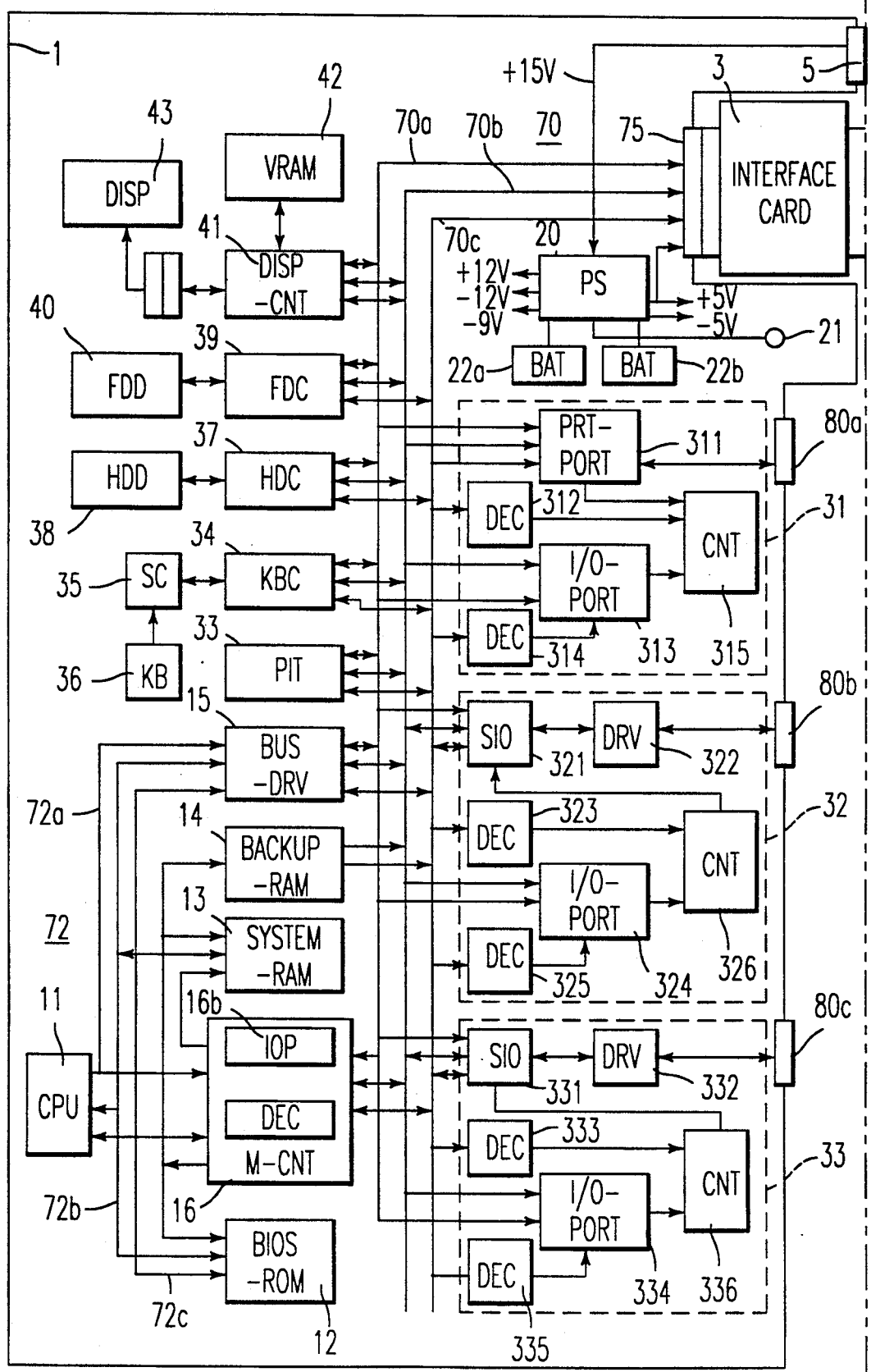
FIGS. 1A and 1B are block diagrams showing an arrangement of a computer system according to an embodiment of the present invention.
Figure 1B:
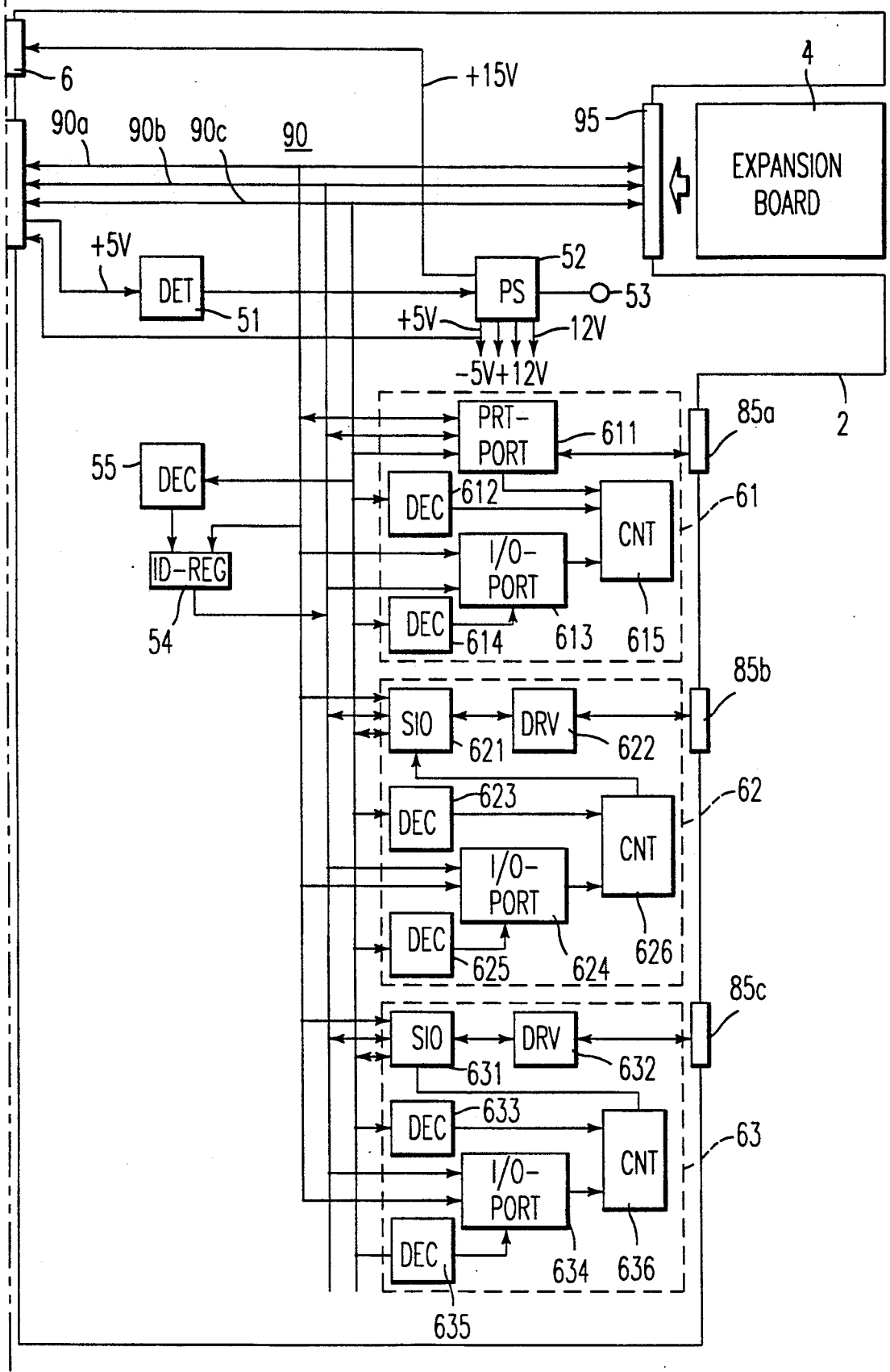

Referring to FIGS. 1A and 1B, a computer system of one embodiment comprises a computer main frame 1 of a laptop type which can be driven by a battery, an expansion unit 2 which can be connected to the computer main frame 1, an interface card 3, and an expansion board 4.

When the expansion unit 2 is to be used, the interface card 3 is connected to an expansion bus connector 75 of the computer main frame 1. The expansion unit 2 is then connected to the computer main frame 1 through the interface card 3.

The expansion board 4 is selectively connected to an expansion bus connector 95 of the expansion unit 2.

In the computer main frame 1, the respective components are directly or indirectly connected to each other through a system bus 70 (a control bus 70a, a data bus 70b, and an address bus 70c). The respective components will be described below.

A BIOS-ROM (read only memory) 12 stores programs and the like for controlling selection of I/O interfaces to be used. When the expansion unit 2 is to be connected, the I/O interface of the expansion unit 2 is used in place of the I/O interface of the computer main frame 1, as will be described later.

A system RAM (random access memory) 13 stores programs and data to be processed.

A backup RAM 14 stores data and the like when resume processing is performed. Note that while the system power supply is turned off, power is supplied to the backup RAM 14 in order to back up stored data and the like.

A bus driver (BUS-DRV) 15 is arranged between a CPU bus 72 (a control bus 72a, a data bus 72b, and an address bus 72c) and the system bus 70 so as to perform data transmission/reception therebetween.

A memory controller (M-CNT) 16 performs access control with respect to the ROM 12 and the RAMs 13 and 14 under the control of the CPU 11. Note that the memory controller 16 includes an address decoder (DEC) 16a for outputting a selection signal to the RAM 14 upon detection of an address designating the RAM 14, and an I/O port (IOP) 16b for performing enable/disable control of the address decoder 16a.

A power supply (PS) 20 applies DC operating voltages (+12 V, −12 V, −9 V, +5 V, and −5 V) to the respective components by using a DC voltage (+15 V) from a power supply adapter (not shown) or the expansion unit 2 connected to a power supply connector 5. In addition, a voltage (+5 V) from the power supply 20 is applied as an operation check signal to a power supply (PS) 52 of the expansion unit 2 through the interface card 3.

That is, if the expansion unit 2 is not connected to the computer main frame 1, the power supply connector 5 is connected to the power supply adapter, and a DC output voltage (+15 V) from the power supply adapter is applied to the power supply 20. If the expansion unit 2 is connected, the power supply connector 5 is connected to a power supply connector 6 of the expansion unit 2, and DC power (+15 V) is supplied from the power supply 52 to the power supply 20. In this case, a DC output voltage (+15 V) is applied from the power supply adapter to the power supply 52. A switch 21 is used to turn on and off the power supply 20.

Batteries (BATs) 22a and 22b can be separately detached and serve to supply power to the power supply 20.

A printer interface 31 is arranged between the system bus 70 and a printer connector 80a so as to transmit/receive data to/from a device such as a printer connected to the printer connector 80a. Note that the printer interface 31 includes a printer port (PRT-PORT) 311 for transmitting/receiving data to/from a device such as a printer connected to the printer connector 80a, an address decoder (DEC) 312 for detecting the port address of the printer port 311, an I/O port (I/O-PORT) 313 for outputting data for controlling the printer port 311, an address decoder (DEC) 314 for detecting the port address of the I/O port 313, and a controller (CNT) 315 for controlling the printer port 311 in accordance with data output from the I/O port 313 and a selection signal supplied from the address decoder 312 upon detection of a port address.

A first RS-232C interface 32 is arranged between the system bus 70 and an RS-232C connector 80b so as to transmit/receive data and the like to/from a device connected to the RS-232C connector 80b. Note that the RS-232C interface 32 includes a serial I/O port (SIO) 321 for transmitting/receiving data and the like to/from a device connected to the RS-232C connector 80b, a driver (DRV) 322, an address decoder (DEC) 323 for detecting the port address of the serial I/O port 321, an I/O port (I/O-PORT) 324 for outputting data for controlling the serial I/O port 321, an address decoder (DEC) 325 for detecting the port address of the I/O port 324, and a controller (CNT) 326 for controlling the serial I/O port 321 in accordance with data output from the I/O port 324 and a selection signal supplied from the address decoder 323 upon detection of a port address.

A second RS-232C interface 33 is arranged between the system bus 70 and the RS-232C connector 80c so as to transmit/receive data and the like to/from a device connected to the RS-323C connector 80c. Note that the second RS-232C interface 33 has the same arrangement as that of the first RS-232C interface 32. That is, the second RS-232C interface 33 includes a serial I/O port (SIO) 331, a driver (DRV) 332, an address decoder (DEC) 333, an I/O port (I/O-PORT) 334, an address decoder (DEC) 335, and a controller (CNT) 336.

In addition, the computer main frame 1 includes a programmable interval timer (PIT) 33 which can be set by a program, a keyboard controller (KBC) 34, a scan controller (SC) 35, a keyboard (KB) 36, a hard disk controller (HDC) 37, a hard disk drive (HDD) 38, a floppy disk controller (FDC) 39, a floppy disk drive (FDD) 40, a display controller (DISP-CNT) 41, a video RAM (VRAM) 42 capable of data backup during a power-OFF period, and a display unit (DISP) 43 constituted by a plasma display or the like.

In the expansion unit 2, the respective components are directly or indirectly connected to each other through a system bus 90 (a control bus 90a, a data bus 90b, and an address bus 90c). Note that the system bus 90 is connected to the system bus 70 of the computer main frame 1 through the interface card 3. The respective components of the expansion unit 2 will be described below.

Upon reception of an operation check signal (+5 V) from the power supply 20 of the computer main frame 1 through the interface card 3, a voltage detector (DET) 51 outputs a power supply enable signal to the power supply enable signal to the power supply (PS) 52.

The power supply 52 comprises an AC/DC converter 52a, a power supply controller 52b, and a constant voltage circuit 52c, as shown in FIG. 1.

The AC/DC converter 52a rectifies/smooths a commercial AC voltage from the power supply adapter and generates a DC voltage (+15 V, +12 V, −12 V, +5 V, and −5 V).

The constant voltage circuit 52c supplies DC operating voltages (+12 V, −12 V, +15 V, and −15 V) from the AC-DC converter 52a to the respective components of the expansion unit 2, and supplies a DC voltage (+15 V) to the power supply 20 of the computer main frame 1.

The power supply controller 52b controls supply of DC voltages from the constant voltage circuit 52c. More specifically, no DC operating voltage (+12 V, −12 V, +5 V, and −5 V) is supplied to the respective components of the expansion unit 2 until a power supply enable signal from the voltage detector (DET) 51 is received.

A switch 53 is used to turn on and off the power supply 52 of the expansion unit 2.

An ID register (ID-REG) 54 is connected to the system bus 90 of the expansion unit 2 so as to store unit ID data inherent in the expansion unit 2. A port address assigned to the I/O port of each I/O interface of the expansion unit 2 can be recognized by referring to this unit ID data.

An address decoder (DEC) 55 performs address detection with respect to the ID register 54.

A printer interface 61 is arranged between the system bus 90 and a printer connector 85a so as to transmit/receive data and the like to/from a device such as a printer connected to the printer connector 85a. Note that the printer interface 61 has the same arrangement as that of the printer interface 31 and hence includes a printer port (PRT-PORT) 611, an address decoder (DEC) 612, an I/O port (I/O-PORT) 613, an address decoder (DEC) 614, and a controller (CNT) 615.

A first RS-232C interface 62 is arranged between the system bus 90 and an RS-232C connector 85b so as to transmit/receive data and the like to/from a device connected to the RS-232C connector 85b. In addition, a second RS-232C interface 63 is arranged between the system bus 90 and an RS-232C connector 85c so as to transmit/receive data and the like to/from a device connected to the RS-232C connector 85c. Note that the RS-232C interfaces 62 and 63 have the same arrangement as that of the RS-232C interfaces 32 and 33 hence respectively include serial I/O ports (SIOs) 621 and 631, drivers (DRVs) 622 and 632, address decoders (DECs) 623 and 633, I/O ports (I/O-PORTs) 624 and 634, address decoders (DECs) 625 and 635, and controllers (CNTs) 626 and 636.

Figure 2:
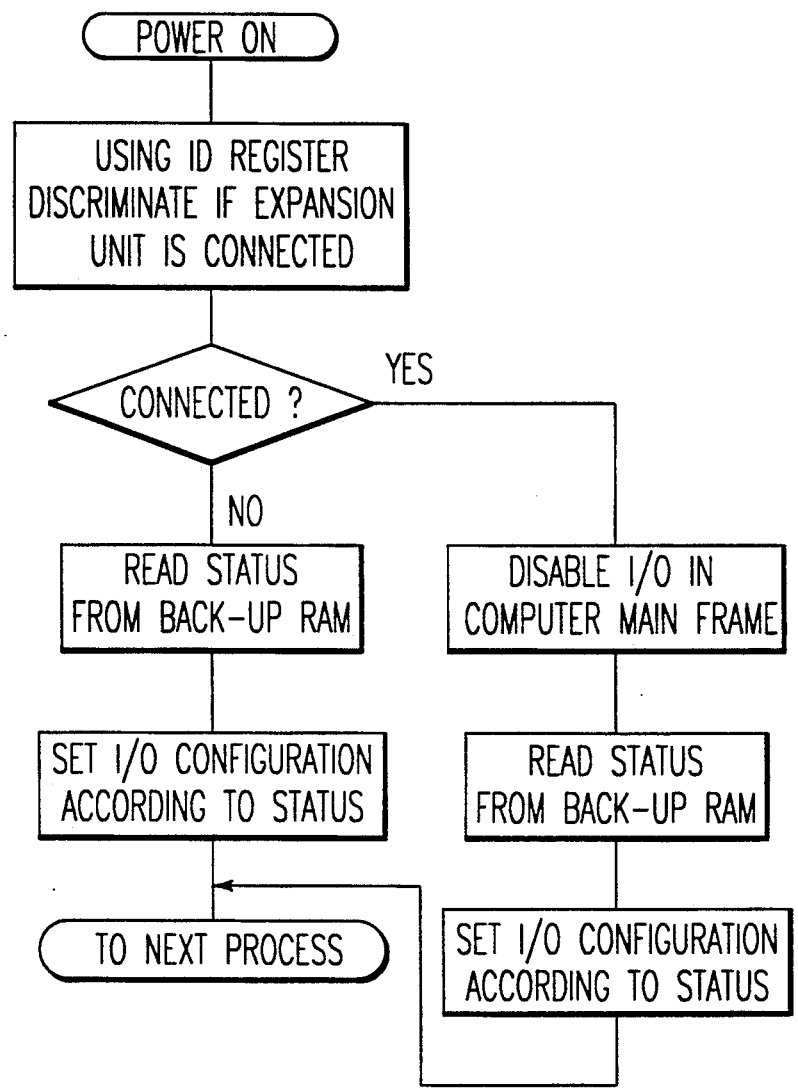
FIGS. 2 and 3 are flow charts for processing automatic configuration controlling.

FIG. 2 is a flow chart illustrating the operation according to this embodiment.

Referring to this diagram, step a is for judging whether or not the expansion unit 2 is connected to the computer main frame 1 based on connection/disconnection data set in the ID register 54. Step b is for branching to different steps depending on whether the expansion unit 2 is connected or not. Step c is for reading status data from the backup RAM 14 when the expansion unit 2 is not connected; the status data is configuration data for setting the I/O address, interrupt level, etc. Step d is for setting the configuration of the computer main frame in accordance with the status data read out in step c. Step e is for disabling the configuration setting of the I/O device by the computer main frame 1 to inhibit the operation of the I/O controllers 31, 32 and 33. Step f, identical to step c, is for reading status data. Step g is for effecting I/O setup to the expansion unit 2.

The operation of this embodiment illustrated in FIGS. 1A and 1B will now be described referring to the flow chart shown in FIG. 2.

The CPU 11, which performs the general control of this system, is connected via the system bus 70 of the main frame with the BIOS ROM 12, the backup RAM 14, etc.

The BIOS ROM 12 is a non-volatile memory holding a program to execute control at the time of initializing or setting up each hardware when the power of the system is provided. The backup RAM 14 holds information (status) necessary for setting the hardware as well as the resume data, and these data are backed up by the power from a backup battery (not shown). Setup information is stored as the status data in the backup RAM 14. This status data will be set by a user with the help of a program, such as a hardware setup program.

First, it is discriminated from the content of the ID register 54 whether or not the expansion unit 2 is connected to the main frame 1 of the personal computer (step a). Supposing that data "AA" has been acquired from the register 54, the expansion unit 2 is considered to be connected to the computer main frame 1 in this case; the expansion unit 2 is not considered to have the connection otherwise.

Processing is then executed according to the information about the connection/disconnection of the expansion unit 2 (step b). If the expansion unit 2 is not connected, the status data is read out from the backup RAM 14 (step c). In accordance with the status, the computer main frame 1 is set to the desired configuration (step d). As a result, for example, the I/O address of the printer interface 31 is set at the address "A," the I/O address of the RS-232C interface 32 at the address "B," and the I/O address of the RS-232C interface 33 at the address "i." These I/O controllers 31 to 33 function in accordance with the configuration set by the computer main frame 1.

When the expansion unit 2 is connected to the computer main frame 1, the configuration setup by the computer main frame 1 will be disabled (step e), thus disabling the I/O controllers 31-33.

Then, as in step c, the status data is read out from the backup RAM 14 (step f). In accordance with this status, the expansion unit 2 is set up for the desired configuration as done in step d (step g). Consequently, the expansion unit 2 has been set up properly in place of the computer main frame 1.

Accordingly, the user can set up the expansion unit 2 in the same configuration as that of the computer main frame 1 by simply connecting the expansion unit to the main frame 1 and without requiring special setup procedures. In this manner, the expansion unit 2 can be used as in the case where the I/O devices are used by the computer main frame alone. The above feature can relieve the user of performing the troublesome task of setting the I/O address, interrupt level and the like of the expansion unit 2.

Figure 3:
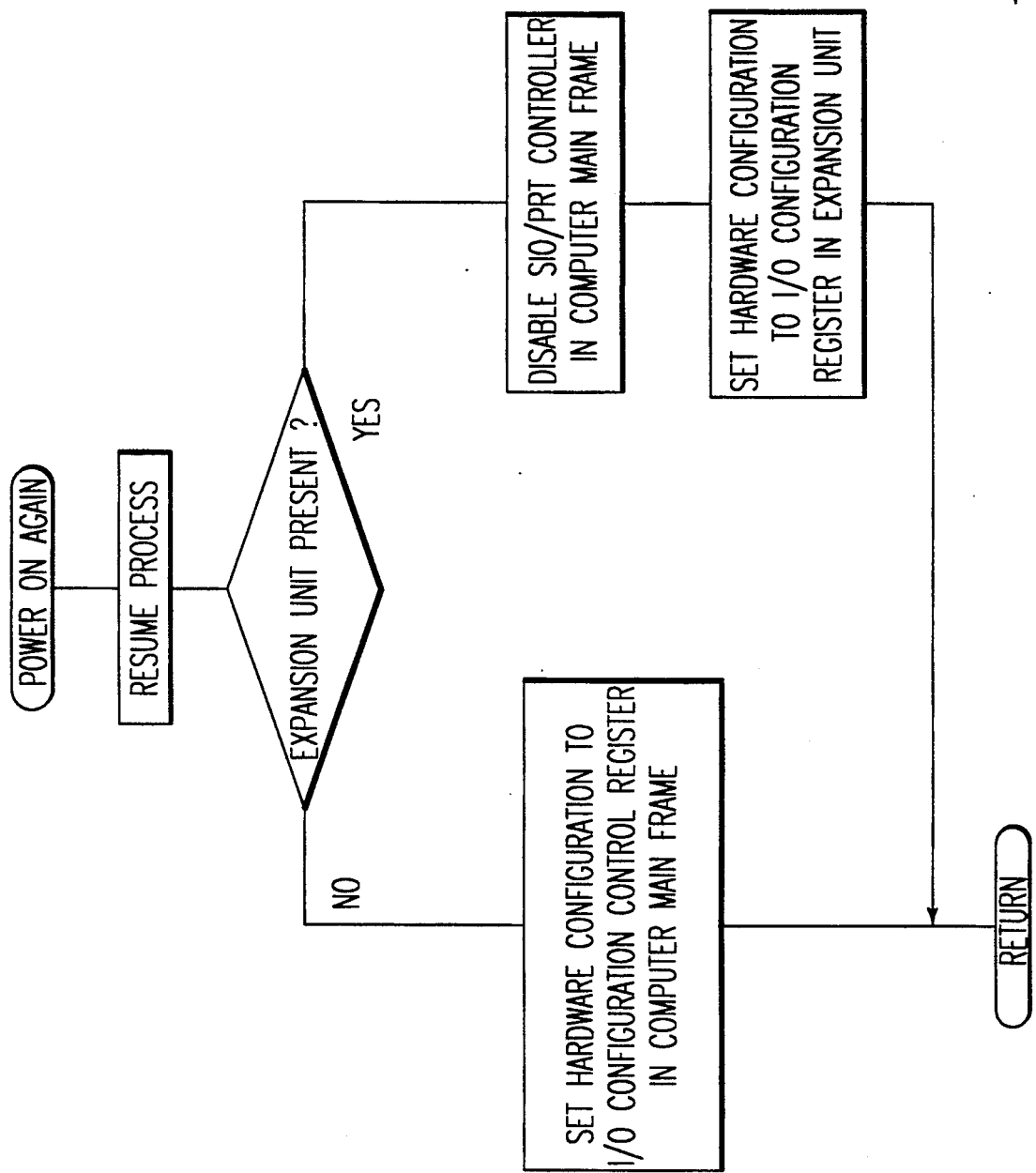

FIG. 3 is a flow chart illustrating the operation of another embodiment according to the present invention. This embodiment shown in FIG. 3 is premised on a personal computer system capable of connecting an expansion unit to a personal computer which supports a resume mode that permits execution of a program from the program status immediately before the previous power cutoff when power is provided again. Therefore, in the BIOS-ROM 12 is provided a program for supporting the resume mode, which saves the program status immediately before power cutoff in advance in the backup RAM 14, and reads it at the time of the next power ON, then resumes the execution of the program. This processing is simply referred to as "resume process" in FIG. 3.

Referring to this diagram, step a is for judging whether or not the expansion unit 2 is connected to the computer main frame 1 based on the content of the ID register 54 incorporated in the expansion unit 2, then branching to different steps depending on the result of the decision. In step b, configuration information, such as I/O addresses, interrupt levels and the like assigned to the I/O controllers for SIO, printer (PRT), etc., which is stored in the backup RAM 14, is set in an I/O configuration control register (not shown) located in the computer main frame 1. Step c is for disabling the I/O controllers 31, 32 and 33, for the SIO, printer (PRT), etc. incorporated in the computer main frame 1, using the I/O configuration control register. Step d following step c is for setting the configuration information, such as I/O addresses, interrupt levels and the like of the I/O controllers for SIO, printer (PRT), etc., which is stored in the backup RAM 14, into an I/O configuration control register incorporated in the expansion unit 2.

The BIOS ROM 12, a non-volatile memory, holds a resume mode processing program to set each hardware configuration, the contents of various types of special registers, and the display screen to what they were at the time prior to power cutoff, when power for the system is provided again. The backup RAM 14 has an area allocated to save information, such as each hardware configuration, the contents of various types of special registers, and the display screen. Setup information, which is to be set in the I/O configuration control register incorporated in the computer main frame 1 or the I/O configuration control register incorporated in the expansion unit 2 is also stored in the backup RAM 14. This information will be stored in the backup RAM 14 when power is cut off in resume mode.

The I/O configuration control register in the computer main frame 1 and the one in the expansion unit 2 have equivalent functions, and serve to control the hardware configuration for determining the I/O addresses of the individual I/O controllers 31, 32, 33, 61, 62 and 63 as well as their interrupt levels. The I/O configuration control registers have a function to disable the I/O controllers which are controlled by the above I/O controllers. The I/O controllers 31 and 61 have equivalent functions, as do the I/O controllers 32 and 62, and the I/O controllers 33 and 63. These I/O controllers are for I/O devices, such as the printer (PRT) and SIO.

The following describes the resume processing of the expansion unit.

First, during reading out of information set in the ID register 54 in the expansion unit 2, the CPU 11 discriminates whether or not the expansion unit 2 is connected to the computer main frame 1 (step a in FIG. 3). Supposing that data "AA" has been written in the ID register 54, the CPU 11 considers that the expansion unit 2 is connected to the computer main frame 1; the CPU 11 does not consider the expansion unit 2 connected to the main frame otherwise.

Different processes will be executed depending on the information about the connection/disconnection of the expansion unit 2. If the expansion unit 2 is not connected, the status data is read out from the backup RAM 14, and the configuration of the I/O configuration control register in the computer main frame 1 is set to the desired setting (step b in FIG. 3). As a result, for example, the I/O address of the SIO controller 62 is set at the address "A," and the I/O address of the PRT controller 61 at the address "B." These I/O controllers 61 and 62 function in accordance with the configuration set by the computer main frame 1.

When the expansion unit 2 is connected to the computer main frame 1, the controllers 31, 32 and 33 for the SIO and printer (PRT) are disabled by the I/O configuration control register in the computer main frame 1 (step d in FIG. 3). Then, as in above step b, the status data is read out from the backup RAM 14, and the controllers 61, 62 and 63 for the SIO and printer (PRT) are set to the desired configuration by the I/O configuration control register on the side of the expansion unit 2 as done in the above step b (step d in FIG. 3).

Through the above processing, the user can set up the configuration of the SIO, printer (PRT), etc. on the side of the expansion unit in the same configuration as that of the SIO, printer (PRT), etc. in the computer main frame 1 by simply connecting the expansion unit to the main frame 1 and without requiring special setup procedures.

What is claimed is:

1. A computer system comprising:
   a computer main frame having at least one input/output control device;
   an expansion unit having at least one input/output control device;
   interface means for connecting said expansion unit to said computer main frame; and
   system configuration control means, incorporated in each of said computer main frame and said expansion unit, for setting at least address data of said input/output control devices included in said computer main frame and said expansion unit.

2. A computer system according to claim 1, wherein said system configuration control means includes:
   power-backup memory means for storing said address data; and
   program executing means for determining a connection status of said expansion unit to said computer main frame when power is on, acquiring said address data from said power-backup memory means and setting said input/output control device of the computer main frame to a desired configuration when said expansion unit is not connected to said computer main frame, and disabling said input/output control device of said computer main frame, acquiring said address data from said memory means, then setting said input/output control device of said expansion unit to a desired configuration when said expansion unit is connected.

3. A computer system according to claim 1, wherein said system configuration control means sets interrupt levels of said input/output control devices of said computer main frame and said expansion unit, respectively.

4. A computer system according to claim 1, wherein said system configuration control means comprises an ID register included in said expansion unit for providing status data to said computer main frame, said status data being dependent upon a connection state of the expansion unit to the computer main frame.

* * * * *